Patented Aug. 3, 1937

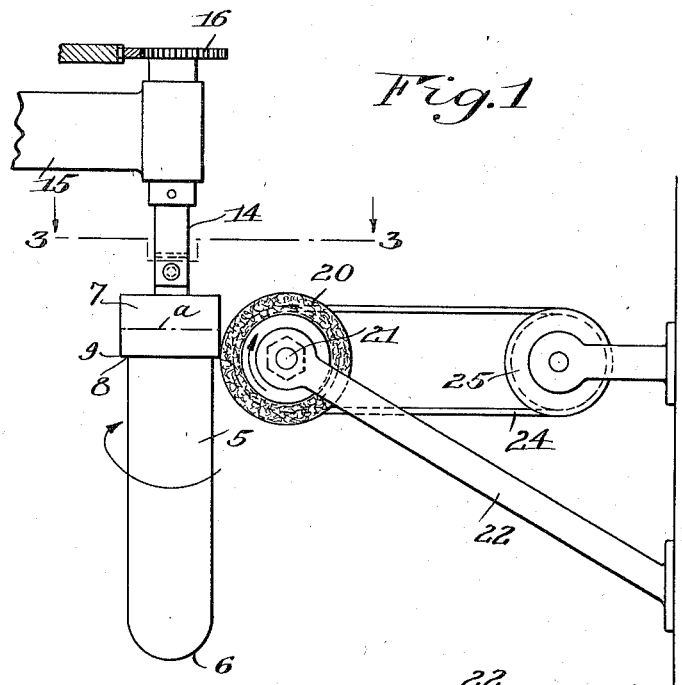
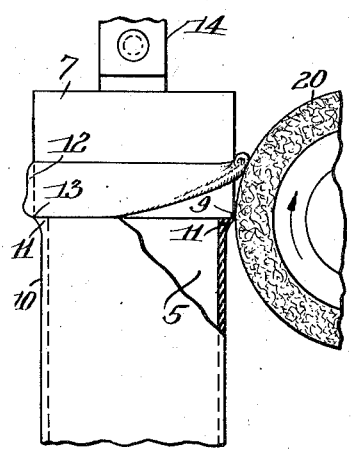
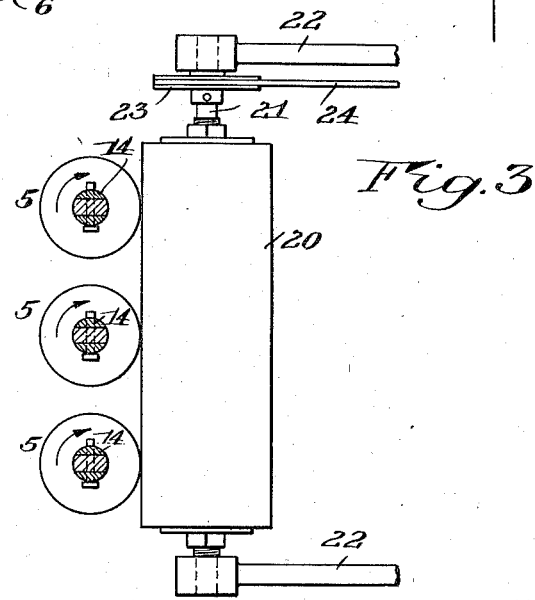

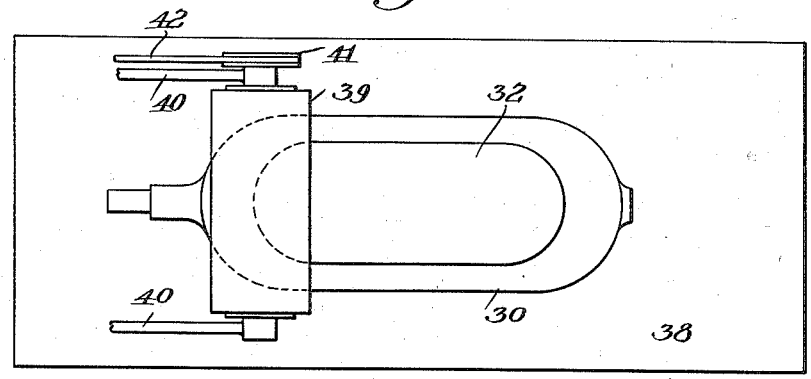
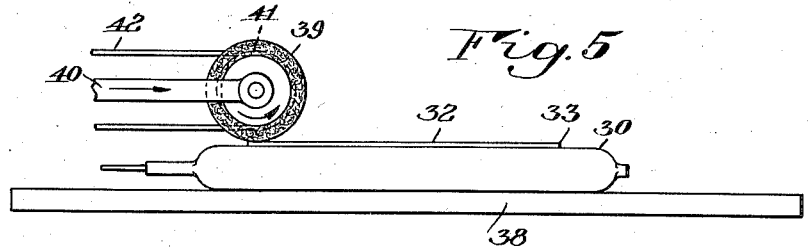
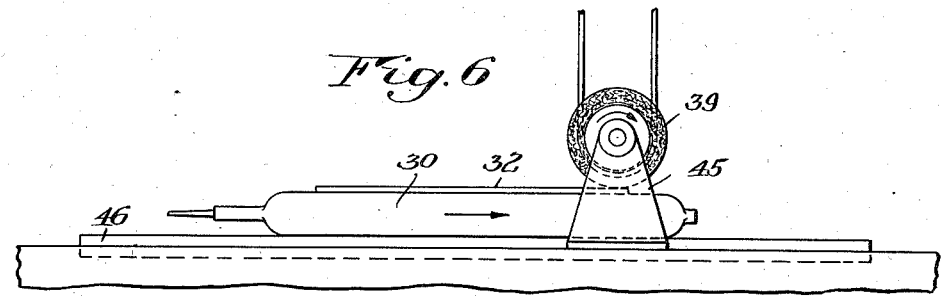
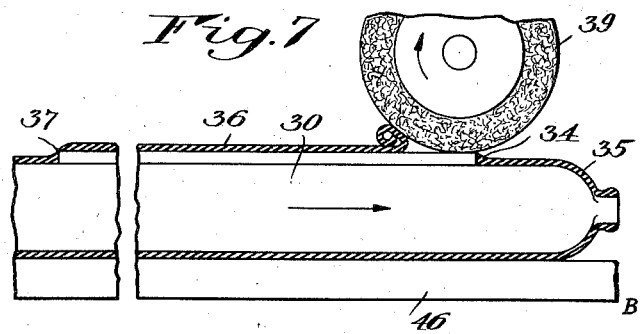

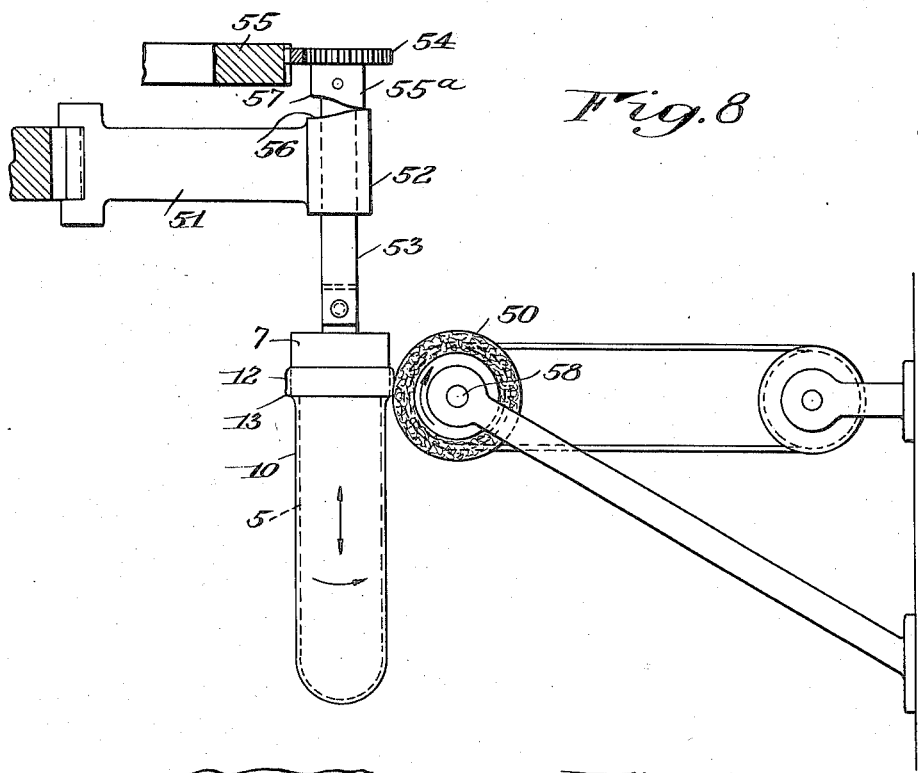
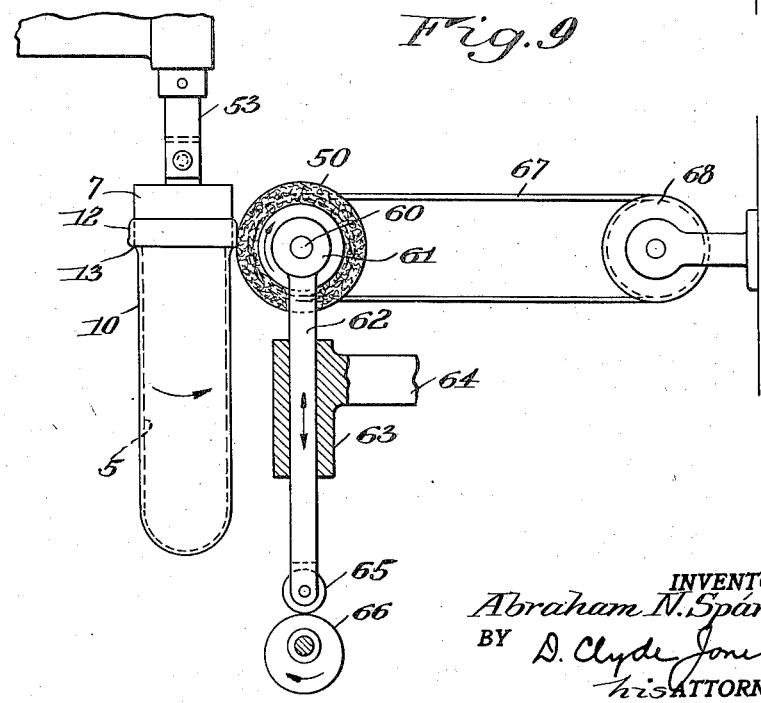

2,088,876

UNITED STATES PATENT OFFICE 2,088,876

METHOD AND APPARATUS FOR TRIMMING RUBBER ARTICLES

Abraham N. Spánel, Rochester, N. Y.

Application October 7, 1935, Serial No. 43,936

17 Claims. (Cl. 18—2)

This invention relates to the method of and to apparatus for trimming rubber articles.

In applicant's Patent #2,015,632, granted September 24, 1935, there is disclosed a method of manufacturing rubber articles having a reinforced edge, according to which method the article is made by depositing rubber on a form with an excess portion of rubber joined to the resulting reinforced edge by a weakened junction. In accordance with the present invention, a novel method and novel apparatus are disclosed for removing or stripping away the excess rubber portion from the rubber article, at the weakened junction.

The various features and advantages of the invention will appear from the detailed description and claims when taken with the drawings in which Fig. 1 is an elevation of one type of apparatus whereby the invention may be put into practice; Fig. 2 is an enlarged fragmentary detailed view partially in section, of a form of Fig. 1 with a rubber article thereon, provided with a reinforced edge and illustrating the excess portion of rubber partially separated from the rubber article at said edge; Fig. 3 is a cross sectional view taken substantially on the line 3—3 of Fig. 1; Figs. 4 and 5 are respectively a plan view and a side view of a modified apparatus for removing the excess rubber from a rubber article carried on a flat form; Fig. 6 is a side view of apparatus similar to that disclosed in Fig. 5 except that the stripping roll is mounted for rotary movement only as distinguished from rotary and reciprocating movement as illustrated in Fig. 5; Fig. 7 is an enlarged fragmentary view partially in section of the structure shown in Fig. 6, illustrating the manner in which the excess portion of rubber is removed from a rubber article which has been deposited on a flat form; Fig. 8 is a side elevation of a further modified apparatus for removing the excess rubber from a rubber article mounted on a form or support which form is rotated and moved longitudinally while the excess rubber portion is engaged by a rotating stripping roll; and Fig. 9 illustrates an additional modified arrangement for stripping away the excess rubber portion from a rubber article mounted on a rotating form or support, the stripping action being effected by a rotating roll engaging said excess portion and adapted to travel with respect to the form.

In Figs. 1, 2 and 3, the invention has been disclosed in connection with apparatus designed for use in finishing finger cots. It will be understood from applicant's mentioned patent, that the finger cot is made by dipping a form 5 one or more times as far as the broken line "a", into an aqueous dispersion of rubber, with a drying interval after each dip. This form, as disclosed in the mentioned patent, is generally cylindrical with its lower portion 6 terminating in a rounded end, while its upper portion is provided with a head 7. This head together with the body of the form defines a recess 8 bounded by an abrupt edge 9. The dipping of the form 5 into an aqueous dispersion of rubber with a drying interval after each dip, develops a finger cot 10 on the form (Fig. 2) with a reinforcing ridge or bead 11 in the deposited rubber layer which bead defines the reinforced edge of the finished cot, the bead 11 being connected to an excess rubber portion 12 through a weakened junction 13.

In accordance with the present invention, a novel method of, and apparatus for stripping away the excess portion 12 of the deposited rubber layer is provided. Although it will be understood that the finger cots may be made by advancing a series of forms 5 mounted on an endless chain, to dip the forms into a bath or successively into a series of baths of an aqueous dispersion of rubber and to pass them through a drying oven after each dip, it has been deemed unnecessary to disclose this construction but merely to illustrate how the excess portion of rubber can be stripped away from a plurality of rubber finger cots after the rubber has dried on the forms. Each form 5 is detachably mounted on a rotating vertical shaft 14, mounted in a suitable bracket 15 which may be fixed or traveling. This shaft is provided at its upper end with any suitable driving means 16 such as a friction drive or gears. The rotating forms 5 with the deposited rubber finger cots thereon are engaged by a friction roll 20 which may be covered with yieldable felt and which is mounted on a horizontal shaft 21 journaled in suitable brackets such as 22. The shaft 21 is provided with driving means such as a pulley 23 which is driven by a belt 24 passing around the driven pulley 25. While the forms 5 can rotate in either direction about their vertical axes, the friction roll 20 should rotate preferably in a clockwise direction as viewed in Fig. 1 with the periphery of the roll engaging the excess rubber portions 12 of the finger cots at approximately their weakened junctions 13. Thus, as the friction roll 20 rotates, it tears away the excess portion 12 at the weakened junction 13 and since the form 5 is also rotating, successive parts of the weakened junction are brought into engagement with the friction roll until the excess portion 12 is torn or stripped away from the reinforced edge 11 of the finger cot. While the friction roll 20 may be of a length to cooperate with only one form 5 having a deposited rubber cot thereon, it is preferred to make this roll of such length that it will simultaneously engage a plurality of forms 5 of which three have been illustrated in Fig. 3.

In the foregoing disclosure, the invention has been illustrated in connection with a rubber article mounted on a cylindrical form. In Figs. 4 to 7 inclusive, the invention is shown in connection with a flattened form having a deposited rubber article thereon. In Figs. 4 and 5, the invention is disclosed in connection with a flattened form 30 on which a rubber sanitary pad shield has been deposited. This form which is more fully disclosed in the mentioned patent, is provided with a raised panel 32 defined by an abrupt edge 33 whereby a rubber shield having a face opening therein with a reinforced edge 34 may be made. In making of a shield or the like on this form, the excess rubber layer 36 (Fig. 7) deposited on the panel 32 must be removed from the shield proper during the finishing operation. It will be understood that this excess portion 36 is connected to the shield proper through a weakened junction 37. In order to remove the excess portion 36 of rubber from the panel 32 of the form, the form is held on a fixed support 38 (Figs. 4 and 5). A friction roll 39 is mounted on a reciprocating bracket 40 while the roll is rotated in any suitable manner such as by a pulley 41 and a driven belt 42. The roll 39 should be mounted in such a manner that it successively engages all portions of the face of the panel 32 while it is rotating. By this arrangement, the roll removes the excess portion of rubber 36 on the face of the panel from the rubber shield proper, by tearing at the weakened junction 37 as shown in Fig. 7.

It will be appreciated that it is merely necessary to have relative movement between the stripping roll and the form with the rubber shield thereon. In Fig. 6 the rotating roll 39 is mounted in fixed brackets 45, while the form 30 with the deposited rubber shield thereon is mounted on a traveling support 46. Thus the support advances successive portions of the face of the panel 32 with the excess rubber layer 36 thereon, into engagement with the rotating roll 39 so that the excess rubber on the face of the panel is stripped away from the remainder of the rubber shield.

In the modification of the invention disclosed in Fig. 8, each form 5 with the untrimmed rubber article 10 thereon, as best illustrated in Fig. 2, is simultaneously rotated about its longitudinal axis and is bodily moved along this axis with the excess portion 12 of the rubber article in engagement with a yieldable roll 50 rotating on a fixed axis. While various constructions may be employed to effect the desired result, the construction disclosed in Fig. 8 is typical. A series of forms 5 of which only one is illustrated are carried by a traveling support 51 mounted on a traveling chain (not shown). The support 51 at one end terminates in a sleeve 52 adapted to serve as a bearing for a shaft 53 to the lower end of which the form 5 is detachably connected. The upper end of the shaft is provided with a gear 54 adapted to engage the teeth of a stationary rack 55 which rack and gear are adapted to rotate the shaft 53 and the form 5 carried thereby. The upper surface of the sleeve 52 is provided with a cam surface 56 with which the inclined surface 57 formed on the edge of the hub 55a, engages to move the shaft 53 and the form 5 bodily along their common axis of rotation. The roll 50 having a yielding surface, is mounted on a suitable axis 58 in such a position that the surface of the roll engages the excess rubber portion 12 of the article adjacent the weakened junction 13.

In removing the excess rubber from the article by this method, the traveling form or forms are rotated about their principal axis since the gear 54 on the shaft 53 of the traveling form engages the teeth of the stationary rack 55. At the same time the rotation of the shaft 53 causes the high point of the inclined surface 57 of the hub 55a to travel down the inclined cam surface 56 of the sleeve 52 with the result that the shaft 53 and the form 5 carried thereby gradually descend. While this is taking place, the yieldable surface of the rotating roll 50 engages the excess portion 12 of the article to tear it away at the weakened junction 13 from the article proper.

Instead of moving the rotating form along its principal axis while the excess rubber portion is engaged by the yieldable surface of a stripping roll mounted on an axis, the form with the rubber article thereon may be rotated and the roll while in engagement with the excess rubber portion may rotate on an axis moving generally parallel to the principal axis of the form as diagrammatically illustrated in Fig. 9. In this arrangement any suitable means may be employed to rotate the shaft 53 and the form 5 carried thereby. The roll 50 has its shaft 60 mounted in bearings 61 formed in the upper end of a reciprocating rod 62. This rod is supported in a sleeve 63 carried by a fixed support 64, the lower end of the rod is provided with a roller or follower 65 which engages the periphery of a rotating cam 66. The roll 50 may be continuously rotated by any convenient driving means such as the belt 67 and the driven pulley 68. In this arrangement the cam 66 periodically raises the rod 62 and the rotating roll 50 carried thereby so that this roll while rising and rotating engages the excess rubber portion 12 of the article to strip this portion away from the article at the weakened junction 13.

While the yieldable surface of the stripping roll has been illustrated as being covered with felt, it may be replaced by relatively soft rubber roll or may be covered with projecting bristles in the form of a cylindrical brush. It will be seen that the cylindrical form with the rubber article might be stationary in relation to the rotating yieldable roll and the trimming or tearing action would still be effected. Also, the form might be mounted on the traveling support in any suitable manner whereby the form, while not power driven, is free to rotate in either direction, and can take on directed rotating movement when the yieldable roll comes into contact with the weakened area of the article on the form.

It will also be obvious that where the form is power driven in any given direction, the yieldable roll might still effect its trimming or tearing operation even though it was itself stationary. The power driven rotating form with the non-rotating roll element in contact with the weakened region of the article on the form, would be sufficient to complete the trimming or tearing action, in spite of the fact that the roll was non-rotating and fixed. For that matter any suitable, stationary yieldable element might be substituted for the roll.

What I claim is:

1. The method of removing an excess portion of rubber from a rubber article mounted on a support, said excess portion being joined to said article through a weakened junction, which method comprises effecting relative movement between the article while on the support and a rotating element gripping a portion of said article.

2. The method of removing an excess portion of rubber from a rubber article mounted on a form on which it has been deposited said excess portion being joined to said article through a weakened junction, which method comprises effecting relative movement between the article while on the form and a yieldable rotating element frictionally gripping a portion of said article adjacent said junction.

3. The method of removing an excess portion of rubber from a rubber article mounted on a form on which it has been deposited, said excess portion being joined to said article through a weakened junction, which method comprises rotating the form with a rubber article thereon and simultaneously gripping said excess portion by an element rotating in a different direction from the rotation of the form.

4. The method of removing an excess portion of rubber from a rubber article mounted on a support, said excess portion being joined to said rubber article through a weakened junction which method comprises holding the support with the article thereon and gripping the excess portion of rubber by a traveling and rotating element.

5. The method of removing an excess rubber portion from a rubber article mounted on a support, said excess portion being joined to said rubber article through a weakened junction which method comprises rotating and bodily moving said support and simultaneously gripping said excess portion by a rotating element.

6. The method of removing an excess portion of rubber from a rubber article mounted on a support, said excess portion being joined to said rubber article through a weakened junction which method comprises rotating and moving said support along its principal axis and simultaneously gripping the excess portion of rubber by a rotating element.

7. The method of removing an excess portion of rubber from a rubber article mounted on a support, said excess portion being joined to said rubber article through a weakened junction which method comprises rotating the support with the article thereon and simultaneously gripping the excess portion of rubber by a rotating element bodily movable away from said junction.

8. The method of removing an excess portion of rubber from a rubber article mounted on a support, said excess portion being joined to said article through a weakened junction, which method comprises effecting relative movement between the support with the article thereon, and a gripping element engaging said excess portion.

9. The method of removing an excess portion of rubber from a rubber article mounted on a support, said excess portion being joined to said article through a weakened junction, which method comprises rotating the support with the rubber article thereon and simultaneously engaging said excess portion by a gripping element.

10. The method of removing an excess portion of rubber from a rubber article mounted on a support, said excess portion being joined to said rubber article through a weakened junction which method comprises holding the support with the article thereon and gripping the excess portion of rubber by a traveling element.

11. The method of removing an excess portion from a rubber article mounted on a support, said excess portion being joined to said rubber article through a weakened junction, which method comprises rotating and bodily moving said support, and simultaneously gripping said excess portion by an element.

12. The method of removing an excess portion of rubber from a rubber article mounted on a support, said excess portion being joined to said rubber article through a weakened junction which method comprises rotating said support about its principal axis while moving said support along its principal axis, and simultaneously gripping the excess portion of rubber by an element.

13. In an arrangement of the class described, a support adapted to carry thereon a rubber article having an excess portion connected to the article proper through a weakened junction, a gripping member in cooperative relation with said support adapted to engage a portion of an article thereon, and means for effecting relative movement between said support and said member.

14. In an arrangement of the class described, a support adapted to carry thereon a rubber article having an excess portion connected to the article proper through a weakened junction, a gripping member in cooperative relation with said support adapted to engage a portion of an article thereon, means for rotating said support, and means for effecting relative movement between said support and said member.

15. In an arrangement of the class described, a support adapted to carry thereon a rubber article having an excess portion connected to the article proper through a weakened junction, a gripping roll having a yieldable surface in cooperative relation with said support adapted to engage the excess portion of the article, and means for rotating said roll.

16. In an arrangement of the class described, a support adapted to carry thereon a rubber article having an excess portion connected to the article proper through a weakened junction, means for rotating the support, a gripping roll having a yieldable surface in cooperative relation with said support, and means for rotating said roll.

17. In an arrangement of the class described, a support adapted to carry thereon a rubber article having an excess portion connected to the article proper through a weakened junction, a gripping roll having a yieldable surface in cooperative relation with said support, and means for rotating and bodily moving said roll while its surface is in engagement with said excess portion.

ABRAHAM N. SPÁNEL.